(12) United States Patent
Wei et al.

(10) Patent No.: US 10,516,551 B2
(45) Date of Patent: Dec. 24, 2019

(54) IN-BAND TELEMETRY WITH LIMITED EXTRA BYTES

(71) Applicant: Futurewei Technologies, Inc., Plano, TX (US)

(72) Inventors: Wei Wei, Plano, TX (US); Jingjing Zhang, Plano, TX (US); Ronggang He, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/871,581

(22) Filed: Jan. 15, 2018

(65) Prior Publication Data

US 2019/0222442 A1 Jul. 18, 2019

(51) Int. Cl.
*H04L 12/54* (2013.01)
*H04Q 11/00* (2006.01)
*H04L 12/26* (2006.01)
*H04L 12/70* (2013.01)
*H04L 1/16* (2006.01)

(52) U.S. Cl.
CPC ..... *H04L 12/5602* (2013.01); *H04Q 11/0066* (2013.01); *H04L 1/1664* (2013.01); *H04L 43/022* (2013.01); *H04L 2012/5625* (2013.01); *H04L 2012/5652* (2013.01); *H04L 2012/5672* (2013.01); *H04Q 2011/0064* (2013.01)

(58) Field of Classification Search
CPC ......... H04L 12/5602; H04L 2012/5652; H04L 2012/5672; H04L 41/00; H04L 2027/0083; H04L 2027/0089; H04L 1/1607; H04L 1/1664; H04L 43/022; H04L 43/024; H04L 47/35; H04L 47/2483; H04Q 11/0066; H04Q 2213/13396; H04Q 2213/13172
See application file for complete search history.

(56) References Cited

U.S. PATENT DOCUMENTS

| | | | |
|---|---|---|---|
| 7,895,425 B2 * | 2/2011 | Khalid | H04L 12/4633 709/226 |
| 2003/0069988 A1 * | 4/2003 | Rune | H04W 99/00 709/237 |
| 2004/0165534 A1 * | 8/2004 | Claseman | H04L 1/0061 370/241.1 |
| 2005/0099949 A1 | 5/2005 | Mohan et al. | |
| 2008/0112330 A1 | 5/2008 | He et al. | |
| 2011/0200323 A1 * | 8/2011 | Li | H04Q 11/0067 398/9 |
| 2011/0222412 A1 * | 9/2011 | Kompella | H04L 45/00 370/241.1 |

(Continued)

OTHER PUBLICATIONS

Brockners, F., et al., "Encapsulations for In-situ OAM Data," draft-brockners-inband-oam-transport-03, Mar. 12, 2017, 21 pages.

(Continued)

*Primary Examiner* — Warner Wong
(74) *Attorney, Agent, or Firm* — Conley Rose, P.C.

(57) ABSTRACT

A method for performing in-band operations, administration, and management (OAM) using fixed bytes. According to one aspect, data packets are selected from a packet flow according to a sampling rate. A network device's OAM information is inserted into a fixed length field of each selected packet as a selected packet is processed by the network device.

17 Claims, 7 Drawing Sheets

(56) References Cited

U.S. PATENT DOCUMENTS

| | | | |
|---|---|---|---|
| 2013/0064113 A1* | 3/2013 | Kawashita | H04L 41/00 370/252 |
| 2014/0092751 A1* | 4/2014 | Meilik | H04L 43/0811 370/241.1 |
| 2015/0288445 A1* | 10/2015 | Lins de Medeiros | H04L 41/0681 398/20 |
| 2016/0234580 A1* | 8/2016 | Clarke | H04Q 11/0066 |
| 2017/0111209 A1* | 4/2017 | Ward | H04L 41/0631 |
| 2017/0201435 A1* | 7/2017 | Tan | H04L 41/085 |
| 2017/0244622 A1* | 8/2017 | Salgueiro | H04L 43/0817 |
| 2017/0250907 A1 | 8/2017 | Pignataro et al. | |

OTHER PUBLICATIONS

Jeyakumar, Vimalkumar, et al. "Millions of little minions: Using packets for low latency network programming and visibility." ACM SIGCOMM Computer Communication Review. vol. 44. No. 4. ACM, 2014, 23 pages.

Allman, Mark, Robert Beverly, and Brian Trammell. "Principles for measurability in protocol design." ACM SIGCOMM Computer Communication Review 4T2 (2017): 2-12, 11 pages.

Foreign Communication From a Counterpart Application, PCT Application No. PCT/CN2019/071517, English Translation of International Search Report dated Apr. 1, 2019, 5 pages.

Foreign Communication From a Counterpart Application, PCT Application No. PCT/CN2019/071517, English Translation of Written Opinion dated Apr. 1, 2019, 4 pages.

\* cited by examiner

IN-BAND TELEMETRY WITH LIMITED EXTRA BYTES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Field of the Invention

The invention generally relates to communication network management. More specifically, the invention relates to systems and methods for providing in-band telemetry using fixed limited bytes in a data packet.

Operations, administration, and management or operations, administration, and maintenance (OA&M or OAM) are the processes, activities, tools, and standards involved with operating, administering, managing, and maintaining a communications network. There are two types of OAM, out-of-band OAM and in-band OAM. Out-of-band OAM measurement traffic is sent as dedicated traffic independent from the data traffic. Examples of out-of-band OAM include Ethernet connectivity fault management (CFM) 802.1ag, Ping, and Traceroute. In-band OAM measurement traffic is embedded in the data traffic. Examples of in-band OAM include Internet Protocol Version 4 (IPv4) route recording and Internet Engineering Task Force (IETF) request for comments (RFC) 791.

SUMMARY

According to one aspect of the present disclosure, there is provided a method for performing in-band OAM. In one embodiment, the method selects packets from a packet flow according to a sampling rate. The method inserts OAM information into a fixed length field of each packet that is selected according to the sampling rate as a selected packet passes through a network device.

According to a second aspect of the present disclosure, a network controller is configured to initialize the sampling rate used by the network devices for selecting the packets from the packet flow. The network controller may also perform a flow characterization process to determine whether the sampling rate is sufficient for characterizing an entire flow of the packet flow. The network controller may adjust the sampling rate of the plurality of network devices so that the sampling rate is sufficient for characterizing the entire flow of the packet flow.

According to a third aspect of the present disclosure, a network device includes an input port; an output port; a memory configured to store instructions and data for performing in-band OAM; and a processing unit configured to execute the instructions to select packets from a packet flow according to a sampling rate, and insert OAM information into a fixed length field of each selected packet as the selected packet passes through the network device.

Optionally, in any of the preceding aspects, the fixed length field may be an existing reserved or optional field in a header of the selected packet and/or a new field that has been appended to the selected packet.

Optionally, in any of the preceding aspects, the OAM information may include an identifier (ID) of the network device, an ingress port of the network device for the selected packet, an egress port of the network device for the selected packet, or a processing delay by the network device for the selected packet.

Optionally, in any of the preceding aspects, the sampling rate may be random, a fixed number of packets, or a fixed time duration. For example, according to one aspect of the present disclosure, a network device may be configured to select a first packet in the packet flow that does not contain the OAM information of an upstream network device, and then select every packet based on a fixed number of packets or fixed time duration after the selection of the first packet from the packet flow. According to one aspect of the present disclosure, the fixed number used for selecting the packets from the packet flow is at least equal to a number of network devices along a route of the packet flow.

Optionally, in any of the preceding aspects, not all data packets of a data flow need to capture in-band OAM to sufficiently characterize the flow of packets in the domain. In any of the preceding aspects, a data packet may only include one network device's in-band OAM information or optionally, a data packet may include more than one network device's in-band OAM information if there are sufficiently available bytes within the fixed byte fields.

The above aspects and other aspects as well as the advantages thereof are described below in the Detailed Description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
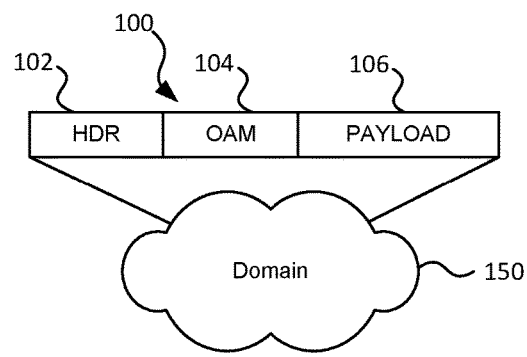
FIG. 1 illustrates a format of a data packet for performing in-band telemetry for a domain.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this disclosure, "or" does not require mutual exclusivity, and the singular forms "a", "an", and "the" are intended to include the plural forms as well, unless the context clearly indicates otherwise.

A module as referenced herein may comprise one or more hardware or electrical components such as electrical circuitry, processors, and memory. The memory may be volatile memory or non-volatile memory that stores data such as, but not limited to, computer executable instructions, machine code, and other various forms of data. The module may be configured to use the data to execute one or more instructions to perform one or more tasks.

Also, as referenced herein, the term "communicatively coupled" means capable of sending and/or receiving data over one or more communication links. In certain embodiments, the communication links may also encompass internal communication between various components of a system and/or with an external input/output device such as a keyboard or display device. Additionally, the communication links may include both wired and wireless links, and may be a direct link or may comprise multiple links passing through one or more communication network devices such as, but not limited to, routers, firewalls, servers, and switches. The network device may be located on various types of networks.

A network as referenced herein means a system of electronic devices that are joined together via communication links to enable the exchanging of information and/or the sharing of resources. Non-limiting examples of networks include local-area networks (LANs), wide-area networks (WANs), metropolitan-area networks (MANs), passive optical networks (PONs), and radio access networks (RANs). The networks may include one or more private networks and/or public networks such as the Internet. The networks may employ any type of communication standards and/or protocol. A network may be part of a bigger network. For example, the network may include one or more domains that are linked with other domains or networks that form a bigger network. A domain as referenced herein means a group of computers and devices on a network that are administered as a unit with common rules and procedures.

As described in the background section, there are two types of OAM, out-of-band OAM and in-band OAM. The term "in-band" refers to the fact that the OAM data is added to the data packets rather than being sent within packets specifically dedicated to OAM. In-band OAM records operational and telemetry information in the packet while the packet traverses a path between two points in the network. In-band OAM provides several advantages over out-of-band OAM including path tracing for equal-cost multi-path routing (ECMP) network, path verification, providing service level agreement (SLA) proof (e.g., delay, jitter, loss, etc.), and custom data such as geo-location.

FIG. 1 illustrates a format of a data packet 100 that is currently being proposed for performing in-band telemetry for domain 150. The data packet 100 includes a header portion 102, an OAM portion 104, and a payload portion 106. The header portion 102 contains addressing and other data that is required for the data packet 100 to reach its intended destination. The payload portion 106 contains the actual data being sent. The OAM portion 104 contains the in-band OAM data such as operational and telemetry information. The in-band OAM data is added to the data packet 100 upon entering the domain 150 and is removed from the data packet 100 when exiting the domain 150. Within the domain 150, the in-band OAM data in the OAM portion 104 of the data packet 100 may be updated by network nodes that the data packet 100 traverses. In-band OAM data in the OAM portion 104 includes an identification of the in-band OAM node (Node ID) such as a device identifier or a particular control point or subsystem within a device, identification of the interface that a packet was received on (ingress ID), identification of the interface/port that a packet was sent out on (egress ID) to determine a packet route, time of day when the packet was processed by the node (timestamp), delay (i.e., how long the network device took to process the packet, e.g., departure time-arrival time), and may include generic in-band OAM data such as geo-location information (location of the node at the time the packet was processed), buffer queue fill level or cache fill level at the time the packet was processed, or even a battery charge level.

Figure 2:
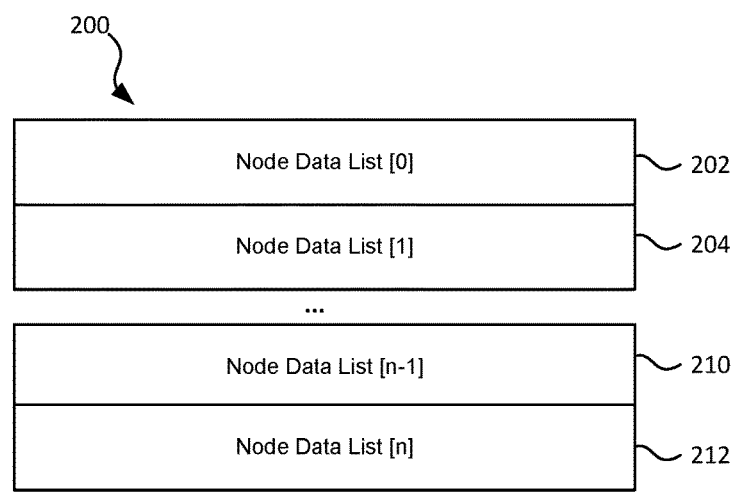
FIG. 2 illustrates a node data list array in a data packet that stores in-band OAM data.

FIG. 2 illustrates a node data list array 200 that stores in-band OAM data for each of the network nodes that updates the OAM data in the data packet 100. The node data list array 200 is stored in the OAM portion 104 of the data packet 100. The node data list array 200 in the data packet 100 is populated iteratively as the data packet 100 traverses the domain 150, starting with the last entry of the node data list array 200. For instance, Node data List [n] 212 is the first entry to be populated with the in-band OAM of the first network device that a packet passes through, Node data List [n−1] 210 is the second entry, Node data List [1] 204 is the second to last entry to be populated, and Node data List [0] 202 is the last entry to be populated. N represents the number of network devices. As can be seen, the number of extra bytes needed in OAM portion 104 of the data packet 100 for telemetry is a linear function of the number of devices the packet flow goes through. Thus, the number of bytes needed for OAM data in the current proposed format of the data packet 100 is not fixed and therefore, may not be scalable for large domains.

Accordingly, the disclosed embodiments seek to provide, among other things, a method for performing in-band OAM using fixed bytes. Advantages of using fixed bytes for in-band OAM include scalability and easier implementation. One distinguishing feature of the disclosed embodiments is that each packet only contains in-band OAM data for a single network device along a packet route as opposed to carrying the in-band OAM data of every network device along the packet route. By inserting the OAM information of only a single network device, the number of extra bytes needed for in-band OAM is not related to the number of network devices that the packet goes through and therefore can be fixed. In various embodiments, each network device is configured to select a packet either randomly, at a fixed time interval, or every fixed number of packets. The network device inserts OAM information into a fixed length field of each selected packet as the selected packet passes through the network device. In certain embodiments, the fixed length field is an existing reserved or optional field in a header of the selected packet. The fixed length field may also be a new field that is appended to the selected packet. By analyzing the in-band OAM information in all packets along a packet flow, an analyzing engine can determine the route of the packet flow, detect route changes, and determine the delay information of each device along the route.

The disclosed embodiments follow certain design principles including explicitly defining the information to be measured and being shared, ensuring that: (1) measurements are made within a communication protocol (i.e., in-band), (2) measurement cost (e.g., memory and computational resources) are borne by the consumer, (3) measurement provider retains control over how much information is provided, (4) measurements are visible and transparent to network elements, and (5) measurements are cooperative between the various network elements (e.g., routers and middle boxes).

Figure 3:
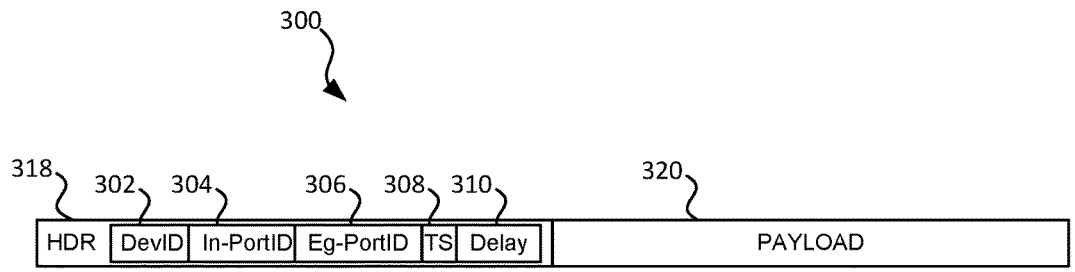
FIG. 3 illustrates a data packet in accordance with an embodiment.

FIG. 3 illustrates a data packet 300 in accordance with an embodiment. The data packet 300 includes a header portion 318 and a payload portion 320. The header portion 318 includes certain reserved or optional fields. For example, packets communicated in accordance with Internet Protocol Version 4 (IPv4), Internet Protocol Version 6 (IPv6), and PON each contain an optional and/or reserved header field for specifying options or reserved for future use. Additionally, the Transmission Control Protocol (TCP) includes a header that includes a reserved field comprising 6 bits and a variable length options field at the end of the TCP header. As shown in FIG. 3, in-band OAM may be inserted into the header using one of the reserved or optional fields of the data packet 300. For example, a network device identifier 302, an ingress port ID 304, egress port ID 306, timestamp 308, and a delay 310 may be inserted into one or more of the reserved or optional fields of the data packet 300. The number of bits needed for the in-band OAM may vary depending on the required preciseness in various embodiments. For the network device identifier 302, if the packet's route is unknown, the minimum number of bits is log 2(N), where N is the number of devices in the network. If the route is known, the minimum number of bits for the network device identifier 302 is log 2(K), where K is the number of devices along the route.

Figure 4:
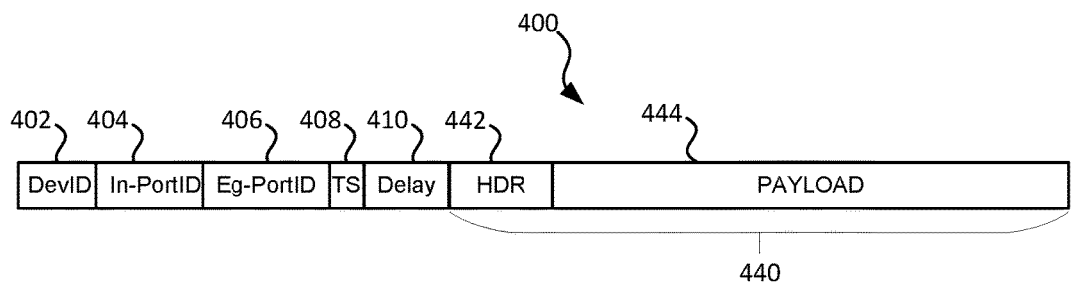
FIG. 4 illustrates a data packet in accordance with another embodiment.

FIG. 4 illustrates a data packet 400 in accordance with another embodiment of the present disclosure. In this embodiment, the data packet 400 includes fixed byte fields that have been added to the original data packet 440. The original data packet 440 includes a header portion 442 and a payload portion 444. In the depicted embodiment, fixed byte fields have been added to the front end of the original data packet 440 (i.e., in front of the header portion 442). Alternatively, in various embodiments, fixed byte fields may be added anywhere in the original data packet 440 such as between the header portion 442 and the payload portion 444 or even after the payload portion 444. Non-limiting examples of fixed byte fields that may be added include a network device identifier field 402, an ingress port ID field 404, egress port ID field 406, a timestamp field 408, and a delay field 410. The fixed byte fields may or may not be contiguous. The size of the fixed byte fields may vary depending on the required preciseness in various embodiments.

Figure 5:
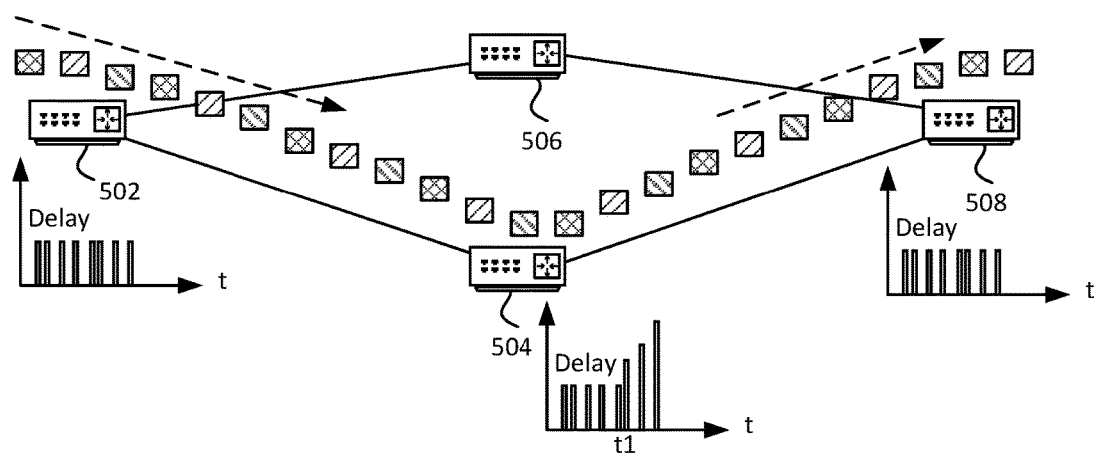
FIG. 5 illustrates a packet sampling scheme in accordance with an embodiment.

FIG. 5 illustrates a packet sampling scheme in accordance with an embodiment. In the depicted embodiment, the domain comprises of four network devices 502, 504, 506, and 508. Each of the network devices 502, 504, 506, and 508 is configured to select a packet according a fixed rate sampling (i.e., every K number of packets, where K is a fixed number). In the various embodiments, K is set to greater than or equal to the total number of communication devices along the route. For example, in FIG. 5, K is set to 3. It should be noted that four devices are shown in FIG. 5 but only three are shown along the route. In the depicted sampling scheme, for incoming packets of the flow, the network devices 502, 504, 506, and 508 are configured to check if a packet already includes the in-band OAM of another network device. If the packet does not already include the in-band OAM of another network device, the network device is configured to insert the in-band OAM information for the network device into the fixed fields of packet. The network device then waits for the next Kth packet to come along and performs the same process. As illustrated in FIG. 5, if K is set to the exact number of network devices along the packet route, every packet in the packet flow is tagged to include the in-band OAM of one and only one of the network devices along the packet route. However, as will be further described, not every single packet needs to be tagged in order to determine the network performance.

In an alternative sampling scheme, each of the network devices 502, 504, 506, and 508 is configured to select a packet according a fixed sampling time T (e.g., every 1 millisecond). Still, in certain embodiments, in any of the disclosed sampling schemes, even if a data packet has been tagged by an earlier network device along the packet route, the network device may be configured to determine and insert its in-band OAM information into the data packet if there are sufficient available bytes in the data packet to do so. Thus, the in-band OAM is still limited to a fixed number of bytes within a data packet.

Figure 6:
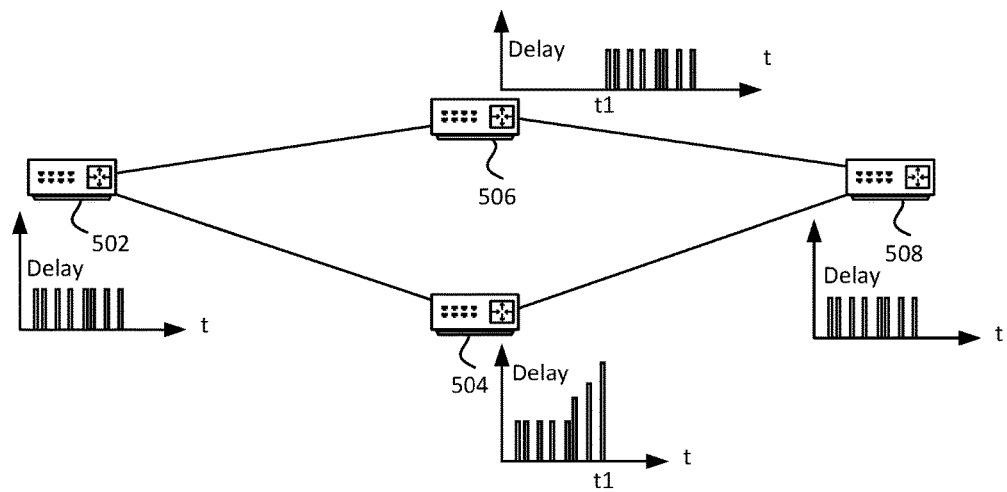
FIG. 6 illustrates a packet routing path in accordance with an embodiment.
Figure 7:
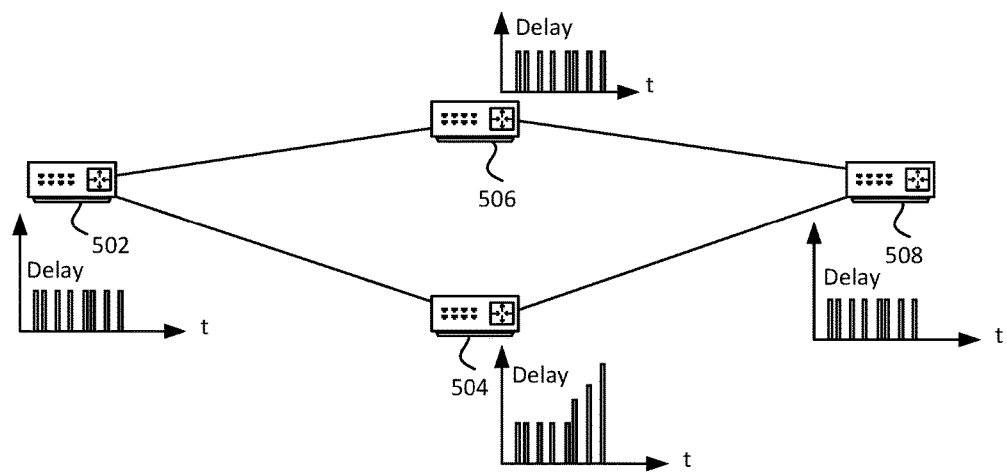
FIG. 7 illustrates a packet routing path in accordance with an embodiment.

FIG. 5 also illustrates the delay for each of the network devices. As indicated in FIG. 5, network device 504 experiences an increase in delay around time T1. Additionally, FIG. 5 illustrates a packet flow route that does not deviate. However, the in-band OAM methods disclosed herein are also able to determine the packet route if it deviates based on the timestamp in-band OAM information inserted into the data packet by each network device and/or if the data packets took multiple routes to arrive at the destination network device. For example, FIG. 6 illustrates that data packets switched routes after a time T1 from route network device 502→network device 504→network device 508 to network route network device 502→network device 506→network device 508. FIG. 7 illustrates a scenario in which the data packets traverse both paths network device 502→network device 504→network device 508 and network device 502→network device 506→network device 508 at various times.

Figure 8:
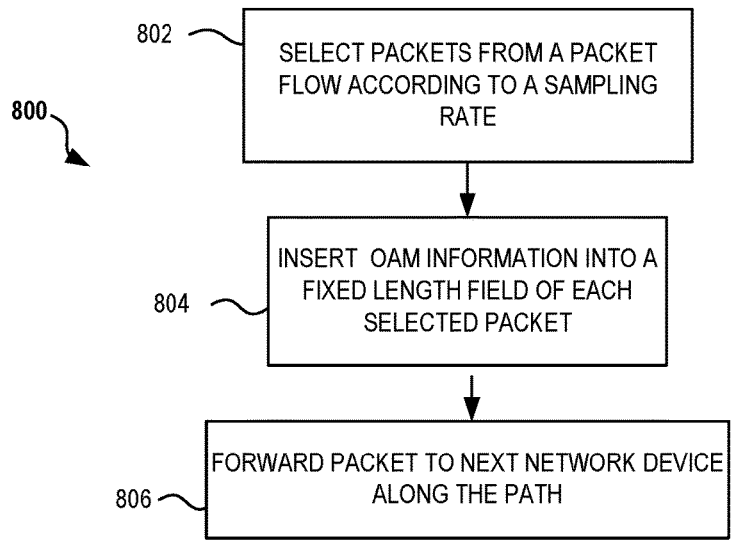
FIG. 8 is a flowchart illustrating a sampling process performed by a network device in accordance with an embodiment.

FIG. 8 is a flowchart illustrating a sampling process 800 performed by a network device in accordance with the illustration in FIG. 5. The process 800 begins at step 802 by selecting packets from the packet flow according a sampling rate. The term sampling rate as used herein means either random, every fixed number of packets, or every fixed time period. At step 804, the process 800 inserts the network device's in-band OAM information into the selected packet into a fixed length field of the data packet. The process 800 at step 806 forwards the packet to the next network device along the path and waits for additional data packets on packet flow.

Figure 9:
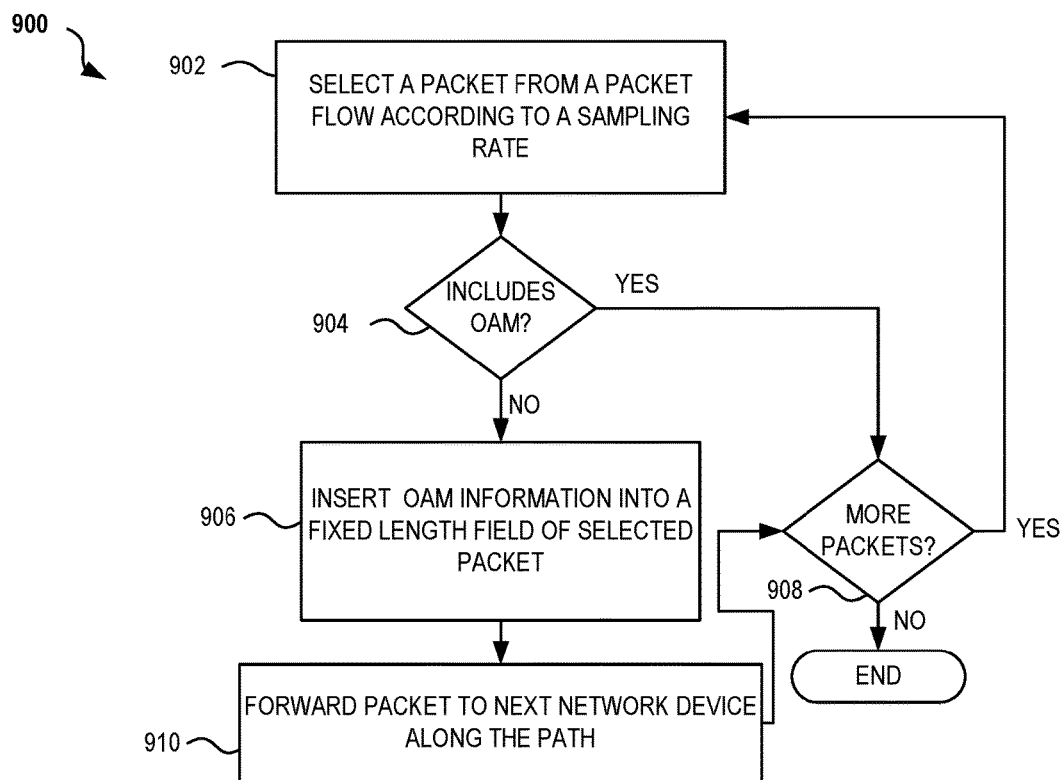
FIG. 9 is a flowchart illustrating a sampling process performed by a network device in accordance with another embodiment.

FIG. 9 is a flowchart illustrating a sampling process 900 performed by a network device in accordance with another disclosed embodiment. The process 900 begins at step 902 by selecting packets from the packet flow according a sampling rate. At step 904, the process 900 determines if the selected data packet already includes in-band OAM from an upstream network device along the path. In this embodiment, if the selected data packet already includes in-band OAM from an upstream network device along the path, the process 900 does not perform any action on the selected data packet and proceeds to step 908 to determine if there are additional data packets in the packet flow to process in which case the process 900 returns to step 902. If the selected data packet does not already include in-band OAM from an upstream network device along the path, the process 900 at step 906 inserts the network device's in-band OAM information into the selected packet into a fixed length field of the data packet. The process 900 at step 910 forwards the packet to the next network device along the path and determines if there are additional packets to be processed at step 908. If there are additional packets to be processed, the process 900 returns to step 902. If there are no additional packets to be processed, the process 900 terminates.

Figure 10:
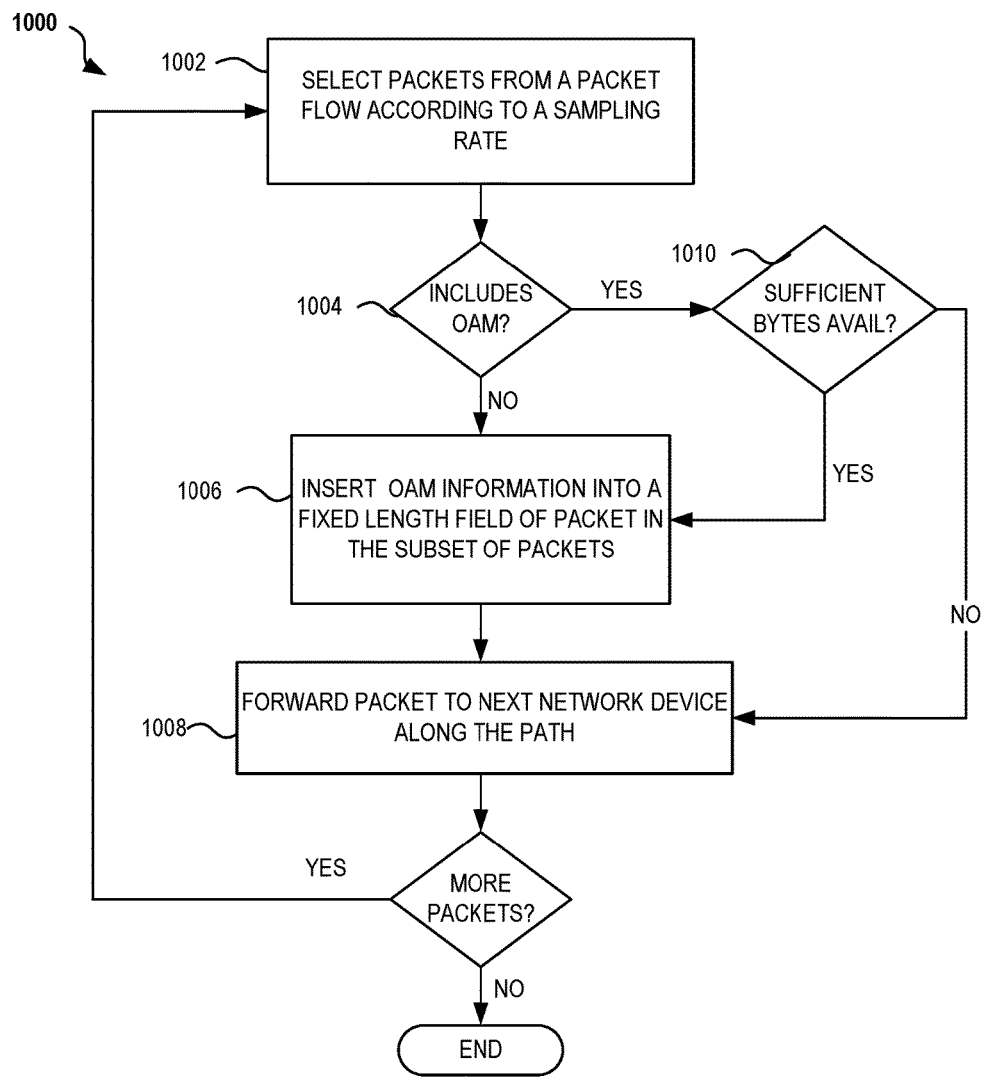
FIG. 10 is a flowchart illustrating a sampling process performed by a network device in accordance with another embodiment.

FIG. 10 is a flowchart illustrating a sampling process 1000 performed by a network device in accordance with another disclosed embodiment. The process 1000 begins at step 1002 by selecting packets from the packet flow according a sampling rate. At step 1004, the process 1000 determines if the selected data packet already includes in-band OAM from an upstream network device along the path. In this embodiment, if the selected data packet already includes in-band OAM from an upstream network device along the path, the process 1000 at step 1010 determines whether there are sufficient bytes available for inserting the in-band OAM of the network device into the packet. For example, if a packet has 20 available bytes and the in-band OAM information of a device only uses 4 bytes, then the packet can carry the in-band OAM information of up to 5 different network devices.

If the process 1000 at step 1010 determines that there are sufficient bytes available for inserting the in-band OAM of the network device into the packet, the process 1000 at step 1006 inserts the network device's in-band OAM information into the selected packet into a fixed length field of the data packet. In certain embodiments, if the available fixed bytes of a packet are equal to or greater than the number of bytes needed per network device times the number of network devices along a route, the process 1000 may be configured to capture the in-band OAM of each network device in each packet. The process 1000 at step 1008 forwards the packet to the next network device along the path and proceeds to step 1012. If the process 1000 at step 1010 determines that there are not sufficient available fixed bytes for inserting the in-band OAM of the network device into the packet, the process 1000 at step 1008 forwards the packet to the next network device along the path and proceeds to step 1012.

If, at step 1004, the process 1000 determines that the selected data packet does not already include in-band OAM from an upstream network device along the path, the process 1000 proceeds to step 1006 and inserts the network device's in-band OAM information into the selected packet into a fixed length field of the data packet. The process 1000 proceeds to step 1008 and forwards the packet to the next network device along the path. The process 1000 proceeds to step 1012.

The process at step 1012 determines whether there are more packets to process in the packet flow. If there are more packets to process in the packet flow, the process 1000 returns to step 1002. If there are no more packets to process in the packet flow, the process 1000 terminates.

Figure 11:
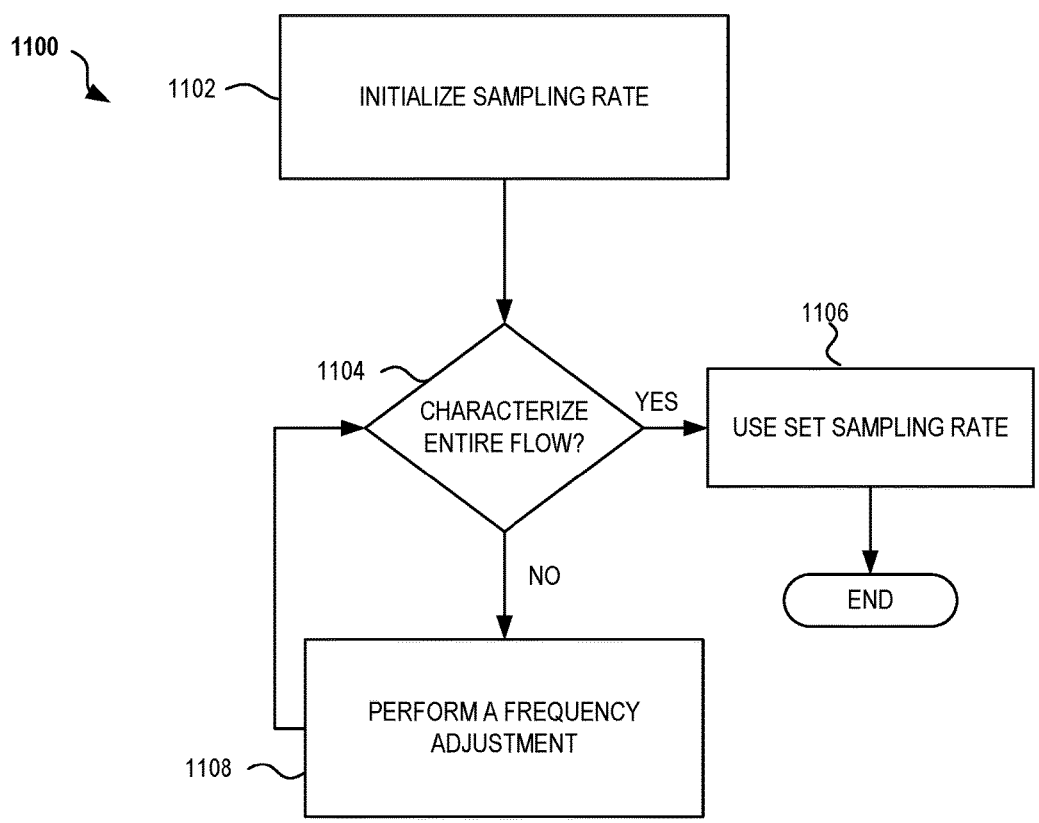
FIG. 11 is a flowchart illustrating a sampling process performed by a network controller in accordance with an embodiment.

FIG. 11 is a flowchart illustrating a sampling process 1100 performed by a network controller in accordance with a disclosed embodiment. The network controller provides a centralized, programmable point of automation to manage, configure, monitor, and troubleshoot the network. The process 1100 begins at step 1102 by initializing a sampling rate in the network devices in a domain controlled by the network controller. The sampling rate is used by the network devices for selecting packets from a packet flow. In one embodiment, the sampling rate K is initialized to be greater than or equal to the number of devices (N) the packet goes through in the network (i.e., K>=N). If K is less than N, then the in-band OAM of every network device is not collected. Thus, at a minimum, K is equal to N. However, setting K to N may not be sufficient to properly characterize all packet flows such as when packets arrive extremely infrequent or the route contains too many network devices. Additionally, if K is initialized too large, then some in-band OAM information may be lost because not enough data packets are being tagged with in-band OAM. Thus, an optimal sampling rate should be determined.

At step 1104, the process 1100 determines whether the initial sampling rate sufficiently characterizes the entire flow. For example, if the sampling rate is set to the number of devices (N) along a packet route, the process 1100 determines if this setting sufficiently characterizes the entire flow. In one embodiment, the process 1100 determines if the current setting sufficiently characterizes the entire flow based on the equation below, which also constrains the maximum K value:

$$\sum_{p=i}^{J}(del_p^A + del_p^B + del_p^C)/(j-i+1) \approx \sum_{x=0}^{(j-i)/3} del_{i+Kx}^A/(j-i) + \sum_{x=1}^{(j-i)/3} del_{i+1+Kx}^B/(j-i) + \sum_{x=2}^{(j-i)/3} del_{i+2+Kx}^C/(j-i).$$ EQ1

The left portion of Equation 1 (EQ1) represents the path delay of all packets. The individual portions of the equation on the right hand side represent the average of the sample traffic of each of the network devices (e.g., average the sample traffic of network device A+ average the sample traffic of network device B+ average the sample traffic of network device C). The delay information may be obtained by the in-band OAM inserted into the packets. The sampling rate sufficiently characterizes the entire flow if the path delay of all packets is approximately equal to the sum of the average of the sample traffic of each of the network devices. In various embodiments, the process may be configured with different ranges that satisfies the condition of how approximately equal the path delays of all packets is to the sum of the average of the sample traffic of each of the network devices to sufficiently characterize the entire flow.

If the process determines that the current sampling rate does not sufficiently characterize the entire flow, the process 1100 at step 1108 performs a frequency adjustment to determine an optimal sampling rate. In one embodiment, the sampling rate K is gradually increased by a set value to a maximum K value. Alternatively, the sampling rate K may be increased to half of the maximum value and then increased or decreased in half as needed until an optimal sampling rate is determined for the flow. The process 1100 returns to step 1104 and determines if the new sampling rate sufficiently characterizes the entire flow. If the process 1100 determines that the current sampling rate sufficiently characterizes the entire flow, the process 1100 at step 1106 uses the set sampling rate for performing in-band OAM.

Figure 12:
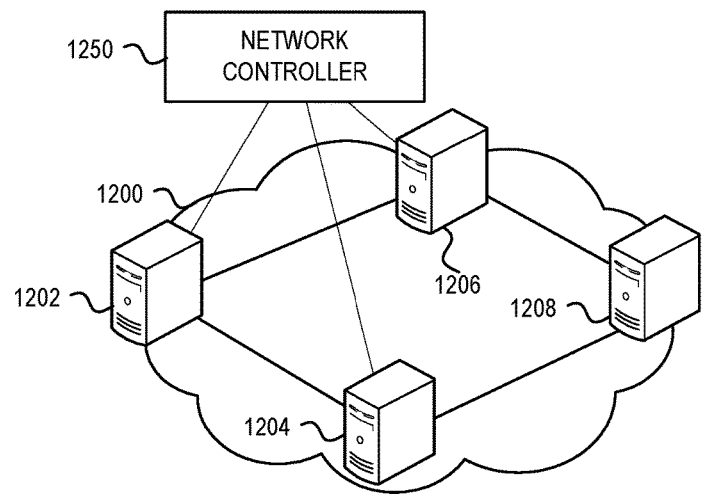
FIG. 12 is a schematic diagram of a network or domain in accordance with an embodiment.

FIG. 12 is a schematic diagram of a network or domain 1200 in accordance with an embodiment. The domain 1200 comprises a plurality of network devices 1202, 1204, 1206, and 1208. The network devices 1202, 1204, 1206, and 1208 may be configured to perform one or more of the processes described in FIGS. 8-10.

A network controller 1250 or network management system provides network control configurations settings and network monitoring for the domain 1200. The network controller 1250 may be an internal or an external device of the domain 1200. In one embodiment, the network controller 1250 is configured to perform the sampling process 1100 described in FIG. 11. The network controller 1250 may also be configured to collect the in-band OAM that is inserted in the data packets by the network devices 1202, 1204, 1206, and 1208 to monitor the network activity and network devices within the domain 1200.

Figure 13:
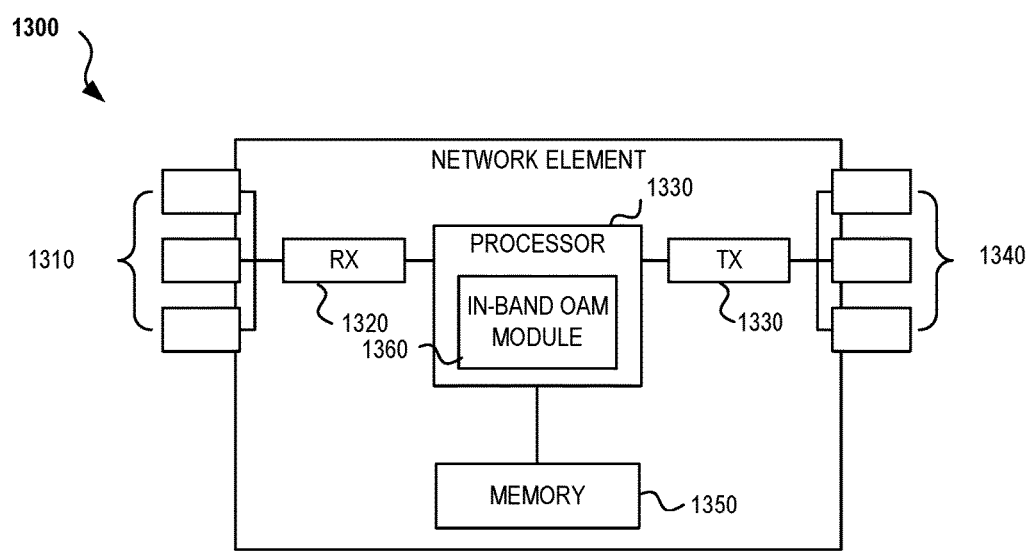
FIG. 13 is a schematic diagram of an apparatus in accordance with an embodiment.

FIG. 13 is a schematic diagram of an apparatus 1300 configured to implement one or more of the methods disclosed herein according to an embodiment of the disclosure. For example, the apparatus 1300 may represent a network device along a packet route or a network controller. The apparatus 1300 comprises ingress ports 1310 and receiver units (Rx) 1320 for receiving data packets, a processor, logic unit, or central processing unit (CPU) 1370 to process the data packets, transmitter units (TX) 1330 and egress ports 1340 for transmitting the data packets, and a memory 1350.

The processor 1370 is implemented by any suitable combination of hardware, middleware, and firmware The processor 1370 may be implemented as one or more CPU chips, cores (e.g. as a multi-core processor), field-programmable gate arrays (FPGAs), application specific integrated circuits (ASICs), or digital signal processors (DSPs). The processor 1370 is in communication with the ingress ports 1310, receiver units 1320, transmitter units 1330, egress ports 1340, and memory 1350.

The memory 1350 comprises one or more disks, tape drives, or solid-state drives and may be used as an over-flow data storage device, to store programs when such programs are selected for execution, or to store instructions and data that are read during program execution. The memory 1350 may be volatile and/or non-volatile and may be read-only memory (ROM), random-access memory (RAM), ternary content-addressable memory (TCAM), or static random-access memory (SRAM). In one embodiment, the memory 1350 comprises an in-band OAM module 1360. The in-band OAM module 1360 comprises executable instructions and data configurations that when executed by the processor 1370 implements the disclosed embodiments as described herein.

Accordingly, the disclosed embodiments provide a method, network device, and network controller for performing in-band OAM using fixed bytes. One advantage of the disclosed embodiments is that the number of bytes used for in-band OAM is fixed and not a function of the number of devices along the route, and therefore is scalable for large domains. The disclosed embodiments are applicable to various types of networks and protocols. For example, in terms of PON, the disclosed embodiments only require one bit to identify an Optical Line Terminal (OLT) and an Optical Network Unit (ONU) and a fixed number of bits for the in-band OAM information. The number of fixed number of bits required may vary based on desired precision. The disclosed embodiments may achieve the same goal of path tracing and path end-to-end (E2E) statistics collecting without the need to tag/collect in-band OAM in all data packets. Other advantages of the disclosed embodiments may also be recognized by one of ordinary skill in the art.

Further aspects and embodiments may be illustrated by the examples illustrated below.

Example 1: A method for performing in-band OAM of a network. The method includes selecting, by a network device, packets from a packet flow according to a sampling rate; and inserting, by the network device, OAM information into a fixed length field of each packet that is selected according to the sampling rate as a selected packet passes through the network device.

Example 2: The method of example 1, wherein the fixed length field is one of an existing reserved field in a header of the selected packet or a new field that is appended to the selected packet.

Example 3: The method of any one of examples 1-2, wherein the OAM information includes at least one of an identifier (ID) of the network device, an egress port of the network device for the selected packet, and a processing delay by the network device for the selected packet.

Example 4: The method of any one of examples 1-3, wherein the packets from the packet flow are selected by selecting a first packet in the packet flow that does not contain the OAM information of an upstream network device, and then selecting every fixed number of packets after the first packet from the packet flow.

Example 5: The method of example 4, wherein the fixed number used for selecting the packets from the packet flow is at least equal to a number of network devices along a route of the packet flow.

Example 6: The method of any one of examples 1-3, wherein the packets from the packet flow are selected by selecting a first packet in the packet flow that does not contain the OAM information of an upstream network device, and selecting a packet from the packet flow after the first packet for every fixed time duration.

Example 7: The method of any one of examples 1-6, wherein the method further includes the steps of determining, by the network device, whether the selected packet includes the OAM information from an upstream network device in the fixed length field; and inserting, by the network device, the OAM information into the fixed length field of the selected packet only in response to a determination that the selected packet does not include the OAM information from the upstream network device in the fixed length field.

Example 8: The method of any one of examples 1-7, wherein the method further includes the steps of determining, by the network device, whether the selected packet includes the OAM information from an upstream network device in the fixed length field; determining, by the network device, whether there are sufficient bytes available in the fixed length field of the selected packet for the OAM information of the network device in response to a determination that the selected packet includes the OAM information from the upstream network device in the fixed length field; and inserting, by the network device, the OAM information of the network device into the fixed length field of the selected packet only in response to a determination that there are sufficient bytes available in the fixed length field of the selected packet for the OAM information of the network device.

Example 9: A network that includes a plurality of network devices configured to: select, by each network device of the plurality of network devices, a varying subset of packets from a packet flow according to a sampling rate; and insert, by each network device of the plurality of network devices, in-band OAM information corresponding to the network device into a fixed length field of each packet in the varying subset of packets as each packet in the varying subset of packets passes through the network device. The network also includes a network controller configured to: initialize the sampling rate used for selecting the packets from the packet flow; perform a flow characterization process to determine whether the sampling rate is sufficient for characterizing an entire flow of the packet flow; adjust the sampling rate of the plurality of network devices in response to a determination that the sampling rate is not sufficient for characterizing the entire flow of the packet flow.

Example 10: A network device configured to insert in-band OAM information into a packet. The network device includes memory configured to store instructions and data for performing in-band OAM. The network device also includes a processing unit configured to execute the instructions to select packets from a packet flow according to a sampling rate; and insert OAM information into a fixed length field of each packet that is selected according to the sampling rate as a selected packet passes through the network device.

Example 11: The network device of example 10, wherein the fixed length field is one of an existing reserved field in a header of the selected packet or a new field that is appended to the selected packet.

Example 12: The network device of any of examples 10-11, wherein the OAM information includes at least one of an identifier (ID) of the network device, an egress port of the network device for the selected packet, and a processing delay by the network device for the selected packet.

Example 13: The network device of any of examples 10-12, wherein the packets from the packet flow are selected by selecting a first packet in the packet flow that does not contain the OAM information of an upstream network device, and then selecting every fixed number of packets after the first packet from the packet flow.

Example 14: The network device of any of examples 10-13, wherein the processing unit is further configured to execute the instructions to determine whether the selected packet includes the OAM information from an upstream network device in the fixed length field; and insert the OAM information into the fixed length field of the packet only in response to a determination that the selected packet does not include the OAM information from the upstream network device in the fixed length field.

Example 15: The network device of any of examples 10-13, wherein the processing unit is further configured to execute the instructions to determine whether the selected packet includes the OAM information from an upstream network device in the fixed length field; determine whether there are sufficient bytes available in the fixed length field of the selected packet for the OAM information of the network device in response to a determination that the selected packet includes the OAM information from the upstream network device in the fixed length field; and insert the OAM information of the network device into the fixed length field of the selected packet only in response to a determination that there are sufficient bytes available in the fixed length field of the selected packet for the OAM information of the network device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for performing in-band operations, administration, and management (OAM) of a network, the method comprising:
    selecting, by a network device, packets from a packet flow according to a sampling rate, by selecting a first packet in the packet flow without the OAM information of an upstream network device, and then selecting every fixed number of packets after the first packet from the packet flow, the fixed number being at least equal to a number of network devices along a route of the packet flow; and
    inserting, by the network device, OAM information into a fixed length field of each packet that is selected according to the sampling rate as a selected packet passes through the network device.

2. The method of claim 1, wherein the fixed length field is an existing reserved field in a header of the selected packet.

3. The method of claim 1, wherein the fixed length field is a new field that is appended to the selected packet.

4. The method of claim 1, wherein the OAM information comprises an identifier (ID) of the network device.

5. The method of claim 1, wherein the OAM information comprises an egress port of the network device for the selected packet.

6. The method of claim 1, wherein the OAM information comprises a processing delay by the network device for the selected packet.

7. The method of claim 1, further comprising selecting a packet from the packet flow after the first packet for every fixed time duration.

8. The method of claim 1, further comprising:
determining, by the network device, whether the selected packet includes the OAM information from an upstream network device in the fixed length field; and
inserting, by the network device, the OAM information into the fixed length field of the selected packet only in response to a determination that the selected packet does not include the OAM information from the upstream network device in the fixed length field.

9. The method of claim 1, further comprising:
determining, by the network device, whether the selected packet includes the OAM information from an upstream network device in the fixed length field;
responsive to a determination that the selected packet includes the OAM information from the upstream network device in the fixed length field, determining, by the network device, whether there are sufficient bytes available in the fixed length field of the selected packet for the OAM information of the network device; and
inserting, by the network device, the OAM information of the network device into the fixed length field of the selected packet only in response to a determination that there are sufficient bytes available in the fixed length field of the selected packet for the OAM information of the network device.

10. A network comprising:
a plurality of network devices configured to:
select, by each network device of the plurality of network devices, a varying subset of packets from a packet flow according to a sampling rate; and
insert, by each network device of the plurality of network devices, in-band operations, administration, and management (OAM) information corresponding to the network device into a fixed length field of each packet in the varying subset of packets as each packet in the varying subset of packets passes through the network device; and
a network controller configured to:
initialize the sampling rate used for selecting the packets from the packet flow;
perform a flow characterization process to determine whether the sampling rate is sufficient for characterizing an entire flow of the packet flow; and
responsive to a determination that the sampling rate is not sufficient for characterizing the entire flow of the packet flow, adjusting the sampling rate of the plurality of network devices.

11. A network device configured to insert in-band operations, administration, and management (OAM) information into a packet, the network device comprising:
a memory configured to store instructions and data for performing in-band OAM; and
a processing unit configured to execute the instructions to:
select packets from a packet flow according to a sampling rate, by selecting a first packet in the packet flow without the OAM information of an upstream network device, and by selecting every fixed number of packets after the first packet from the packet flow, the fixed number being at least equal to a number of network devices along a route of the packet flow; and
insert OAM information into a fixed length field of each packet that is selected according to the sampling rate as a selected packet passes through the network device.

12. The network device of claim 11, wherein the fixed length field is an existing reserved field in a header of the selected packet.

13. The network device of claim 11, wherein the fixed length field is a new field that is appended to the selected packet.

14. The network device of claim 11, wherein the OAM information comprises an identifier (ID) of the network device, an egress port of the network device for the selected packet, and a processing delay by the network device for the selected packet.

15. The network device of claim 11, the processing unit configured to execute the instructions to select a packet from the packet flow after the first packet for every fixed time duration.

16. The network device of claim 11, wherein the processing unit is further configured to execute the instructions to:
determine whether the selected packet includes the OAM information from an upstream network device in the fixed length field; and
insert the OAM information into the fixed length field of the packet only in response to a determination that the selected packet does not include the OAM information from the upstream network device in the fixed length field.

17. The network device of claim 11, wherein the processing unit is further configured to execute the instructions to:
determine whether the selected packet includes the OAM information from an upstream network device in the fixed length field;
responsive to a determination that the selected packet includes the OAM information from the upstream network device in the fixed length field, determine whether there are sufficient bytes available in the fixed length field of the selected packet for the OAM information of the network device; and
insert the OAM information of the network device into the fixed length field of the selected packet only in response to a determination that there are sufficient bytes available in the fixed length field of the selected packet for the OAM information of the network device.

* * * * *

UNITED STATES PATENT AND TRADEMARK OFFICE
CERTIFICATE OF CORRECTION

PATENT NO. : 10,516,551 B2  
APPLICATION NO. : 15/871581  
DATED : December 24, 2019  
INVENTOR(S) : Wei Wei et al.

It is certified that error appears in the above-identified patent and that said Letters Patent is hereby corrected as shown below:

On the Title Page

Page 2, Other Publications, Column 1 Lines 5-7 should read:  
Allman, Mark, Robert Beverly, and Brian Trammell. "Principles for measurability in protocol design." ACM SIGCOMM Computer Communication Review 47.2 (2017): 2-12, 11 pages.

Signed and Sealed this  
Eleventh Day of February, 2020

Andrei Iancu  
*Director of the United States Patent and Trademark Office*